United States Patent [19]

Yamano et al.

[11] Patent Number: 5,282,191
[45] Date of Patent: Jan. 25, 1994

[54] INFORMATION REPRODUCING METHOD AND INFORMATION REPRODUCING APPARATUS WHICH USES THE METHOD

[75] Inventors: Akihiko Yamano, Sagamihara; Katsunori Hatanaka, Yokohama; Kunihiro Sakai, Isehara; Takahiro Oguchi, Ebina; Shunichi Shido, Yokohama, all of Japan

[73] Assignee: Canon Kabushiki Kaisha, Tokyo, Japan

[21] Appl. No.: 893,043

[22] Filed: Jun. 3, 1992

[30] Foreign Application Priority Data

Jun. 11, 1991 [JP] Japan .................. 3-139093

[51] Int. Cl.⁵ .............................................. G11B 9/00
[52] U.S. Cl. ........................................ 369/126; 369/100; 369/124
[58] Field of Search ............... 369/100, 116, 124, 126

[56] References Cited

U.S. PATENT DOCUMENTS

| 4,878,213 | 10/1989 | Kazan et al. | 369/126 |
| 5,199,021 | 3/1993 | Hatanaka et al. | 369/126 |
| 5,222,060 | 6/1993 | Kuroda et al. | 369/126 |

FOREIGN PATENT DOCUMENTS

| 61-80536 | 4/1986 | Japan . |
| 63-161552 | 7/1988 | Japan . |
| 63-161553 | 7/1988 | Japan . |
| 1107341 | 4/1989 | Japan . |
| 2-50333 | 2/1990 | Japan . |

OTHER PUBLICATIONS

"Surface Studies by Scanning Tunneling Microscopy", Physical Review Letters, G. Binning et al., vol. 49, No. 1, Jul. 5, 1982, pp. 57–60.

*Primary Examiner*—Paul M. Dzierzynski
*Assistant Examiner*—Don Wong
*Attorney, Agent, or Firm*—Fitzpatrick, Cella, Harper & Scinto

[57] ABSTRACT

In a reproducing operation, scanning information is detected while scanning an information string with a probe such that a density of the scan lines is higher than a density of the recorded information, and a logical-sum signal of the plurality of scanning information is used as a reproduced signal. It is thereby possible to prevent deterioration during information processing of the S/N ratio and the like produced due to a positional error of a recording-medium control mechanism caused by various factors.

4 Claims, 7 Drawing Sheets

| | | | | |
|---|---|---|---|---|
| A₁ | 0 | 0 | 0 | 0 |
| B₁ | 0 | 0 | 1 | 0 |
| C₁ | 0 | 0 | 0 | 1 |
| D₁ | 0 | 1 | 0 | 0 |
| E₁ | 1 | 0 | 0 | 0 |
| F₁ | 0 | 0 | 0 | 0 |
| G₁ | 1 | 1 | 0 | 1 |

FIG. 3(2)

| | | | | |
|---|---|---|---|---|
| A₂ | 0 | 0 | 0 | 1 |
| B₂ | 0 | 0 | 0 | 1 |
| C₂ | 0 | 1 | 1 | 0 |
| D₂ | 0 | 1 | 0 | 0 |
| E₂ | 0 | 0 | 0 | 0 |
| F₂ | 0 | 0 | 0 | 0 |
| G₂ | 0 | 1 | 1 | 1 |

TIME

FIG. 7(1)

| | | | | |
|---|---|---|---|---|
| $A_1$ | 0 | 0 | 0 | 0 |
| $B_1$ | 0 | 0 | 0 | 2 | 1 |
| $C_1$ | 0 | 0 | 0 | 2 | 0 |
| $D_1$ | 0 | 1 | 0 | 0 | 0 |
| $E_1$ | 2 | 0 | 0 | 0 | 0 |
| $F_1$ | 0 | 0 | 0 | 0 | 0 |
| $G_1$ | 2 | 1 | 0 | 2 | 1 |

FIG. 7(2)

| | | | | |
|---|---|---|---|---|
| $A_2$ | 0 | 0 | 0 | 0 | 0 |
| $B_2$ | 0 | 0 | 0 | 1 | 0 |
| $C_2$ | 0 | 2 | 1 | 1 | 0 |
| $D_2$ | 0 | 2 | 0 | 0 | 0 |
| $E_2$ | 0 | 0 | 0 | 0 | 0 |
| $F_2$ | 0 | 0 | 0 | 0 | 0 |
| $G_2$ | 0 | 2 | 1 | 1 | 0 |

INFORMATION REPRODUCING METHOD AND INFORMATION REPRODUCING APPARATUS WHICH USES THE METHOD

BACKGROUND OF THE INVENTION

1. Field of the Invention

This invention relates to the technical field of high-density and large-capacity memory devices which use, for example, the principle of a scanning tunneling microscope (hereinafter termed an STM).

2. Description of the Prior Art

Heretofore, semiconductor memories comprising semiconductors and magnetic memories comprising magnetic materials have been mainly used as memories. Recently, however, in accordance with the development of laser techniques, inexpensive high-density recording media comprising optical memories which use organic thin films made of organic dyes, photopolymers or the like have appeared.

In addition, STM's which can directly observe the electronic structure of surface atoms of a conductor have been developed (G. Binnig et al. Phys. Rev. Lett. 49, 57 (1982)). The STM has the advantages that a real-space image of a material, irrespective of crystalline or amorphous, can be measured with high resolution, a sample can be observed at low power without damaging it by current, and since the apparatus operates even in air, it can therefore be used for various materials. Accordingly, a wide range of applications is expected. The STM utilizes the phenomenon that a tunnel current flows when a metal probe (probe electrode) and a conductive substance are brought as close as about 1 nm (nanometer) while applying a voltage between them. The tunnel current is very sensitive to a change in the distance between the probe and the substance. By scanning the probe so as to maintain the tunnel current at a constant value, it is even possible to read various kinds of information with respect to the entire electronic cloud of a real space. At that time, resolution in the direction of the plane of the substance is about 0.1 nm.

Accordingly, by applying the principle of the STM, it is possible to sufficiently record and reproduce high-density data in the atomic order (in the order of sub-nanometers). For example, in a recording/reproducing apparatus disclosed in Japanese Patent Application Public Disclosure (Kokai) No. 61-80536 (1986), a writing operation is performed while removing atomic particles adsorbed on the surface of a medium using an electronic beam or the like, and the written data is reproduced using an STM.

Methods exist in which an STM performs recording and reproducing operations using a thin-film recording layer of a material having a memory effect with respect to voltage-current switching characteristics. Examples of recording layer materials include a $\pi$-electron-type organic compound, a chalcogenide compound or the like, and are disclosed, for example, in Japanese Patent Application Public Disclosures (Kokai) Nos. 63-161552 (1988) and 63-161553 (1988). According to such methods, large-capacity recording and reproducing operations on the order of $10^{12}$ bits/cm$^2$ become possible assuming the size of recording bits of 10 nms.

In using such recording/reproducing methods, in order to reproduce data with an excellent S/N ratio, it is in general necessary to perform so-called tracking control wherein a probe electrode is moved along a recorded signal string while performing feedback control, since recording bits are very small. For example, a method has been proposed in Japanese Patent Application Public Disclosure (Kokai) No. 1-107341 (1989) wherein a V-shaped groove is previously formed on the surface of a recording medium, and a probe electrode is controlled so as to be always situated in the center of the groove. On the other hand, methods which do not require a tracking operation have been proposed. For example, a method is disclosed in Japanese Patent Application Public Disclosure (Kokai) No. 2-50333 (1990), wherein, in a reproducing operation, information is read by scanning a recorded signal string with a probe electrode with a density higher than the recording density without performing a tracking operation, and recorded information is reproduced using a pattern recognition technique.

However, control is complicated in the above-described methods which use a tracking operation, and a complicated pattern recognition process requiring a long processing time is necessary in the above-described method which uses pattern recognition without using a tracking operation.

SUMMARY OF THE INVENTION

It is an object of the present invention to provide a method and apparatus which can easily reproduce information without performing a tracking operation.

In a method of reproducing information by scanning a recorded signal string with a probe with a density higher than the recording density in a reproducing operation, by using a logical-sum signal of a plurality of scanning information strings as a reproducing signal, it is possible to prevent deterioration in the S/N ratio and the like produced by a positional error of a recording-medium control mechanism caused by various factors in information processing

BRIEF DESCRIPTION OF THE DRAWINGS

FIGS. 3(1) and 3(2) are diagrams illustrating reproduced information obtained by the scanning method shown in FIG. 2;

FIGS. 7(1) and 7(2) are diagrams illustrating reproduced information obtained by the scanning method shown in FIG. 6.

DESCRIPTION OF THE PREFERRED EMBODIMENTS

Figure 1:
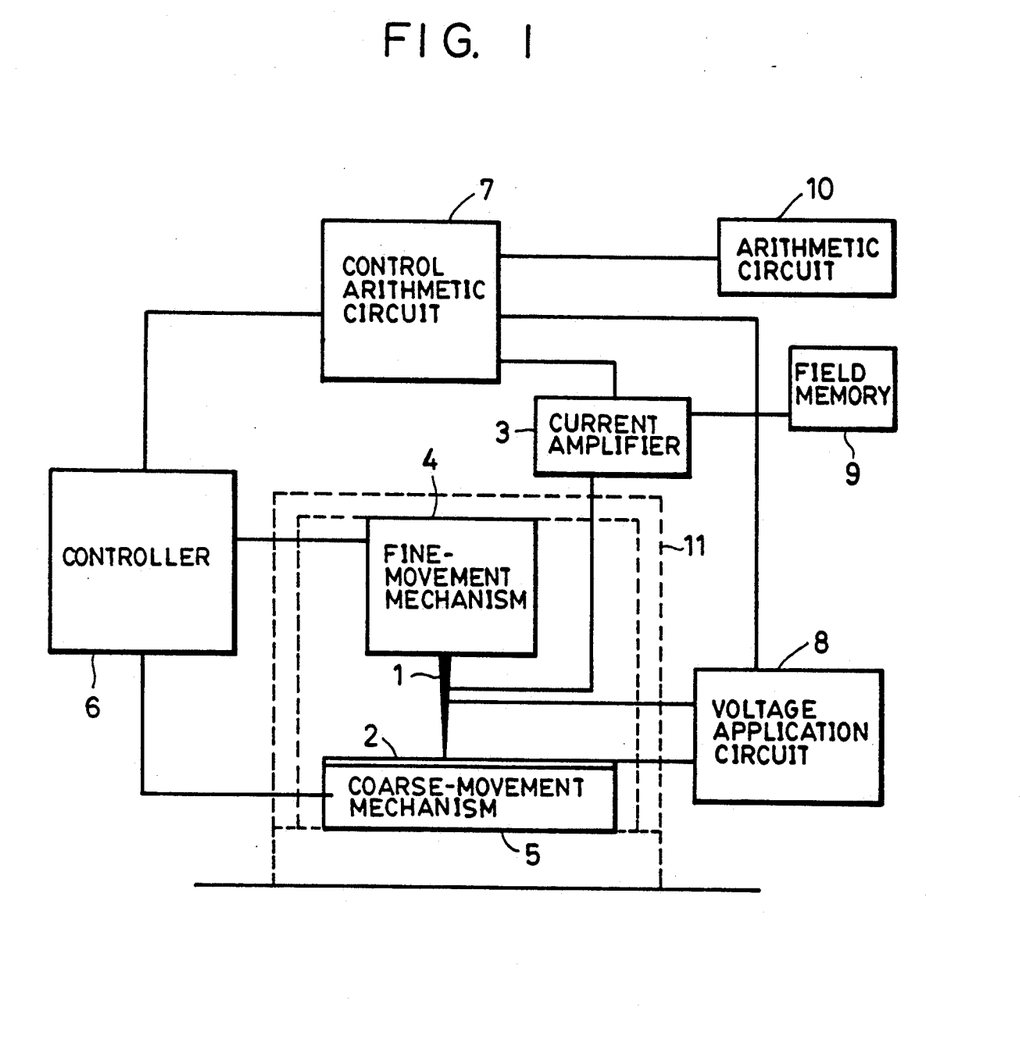
FIG. 1 is a diagram showing a recording/reproducing apparatus according to an embodiment of the present invention.

FIG. 1 is a block diagram showing the entire configuration of an information recording/reproducing apparatus according to an embodiment of the present invention. In FIG. 1, a tungsten needle is used as a probe electrode 1. In order to increase resolution in recording and reproducing operations, the front end of the tungsten needle is sharply processed by mechanical polishing, electropolishing or the like. Pt-Ir, Pt or the like may also be used as the material for the probe electrode 1, and the processing method is not limited to the above-described methods. A recording medium 2 comprises a material having the property of switching between states which have different conductivities, that is, a memory switching property in the current-voltage characteristic. In the present embodiment, the recording medium 2 is provided by accumulating eight layers of SOAZ (squalirium-bis-6-octyl azulene) on a graphite substrate using the LB (Langmuir-Blodgett) method. A current amplifier 3 converts a current (tunnel current) flowing in the probe electrode 1 into a voltage and amplifies the converted voltage. A fine-movement mechanism 4 includes cylindrical piezoelectric elements, and finely moves the probe electrode 1 in the direction of the plane of the recording medium 2 (X and Y directions) and in the direction to control the amount of space between the recording medium 2 and the probe electrode 1 (Z direction). A coarse-movement mechanism 5 includes parallel springs comprising elastic hinges, and holds and coarsely moves the recording medium 2 in the X and Y directions. An XYZ controller 6 controls the fine-movement mechanism 4 and the coarse-movement mechanism 5 by providing them with control voltages. A control arithmetic circuit 7 modulates and demodulates data while controlling the respective units. A voltage application circuit 8 can apply an arbitrary voltage between $-10$ V (volts) and $+10$ V between the probe electrode 1 and the recording medium 2. The voltage application circuit 8 applies a pulse-like voltage having a value corresponding to the recorded value in recording and erasing operations, and applies a constant bias voltage in a reproducing operation. A field memory 9 temporarily stores data read in a reproducing operation. An arithmetic circuit 10 performs logical calculation of information stored in the field memory 9.

EXAMPLE 1

Figures 2A, 2B:
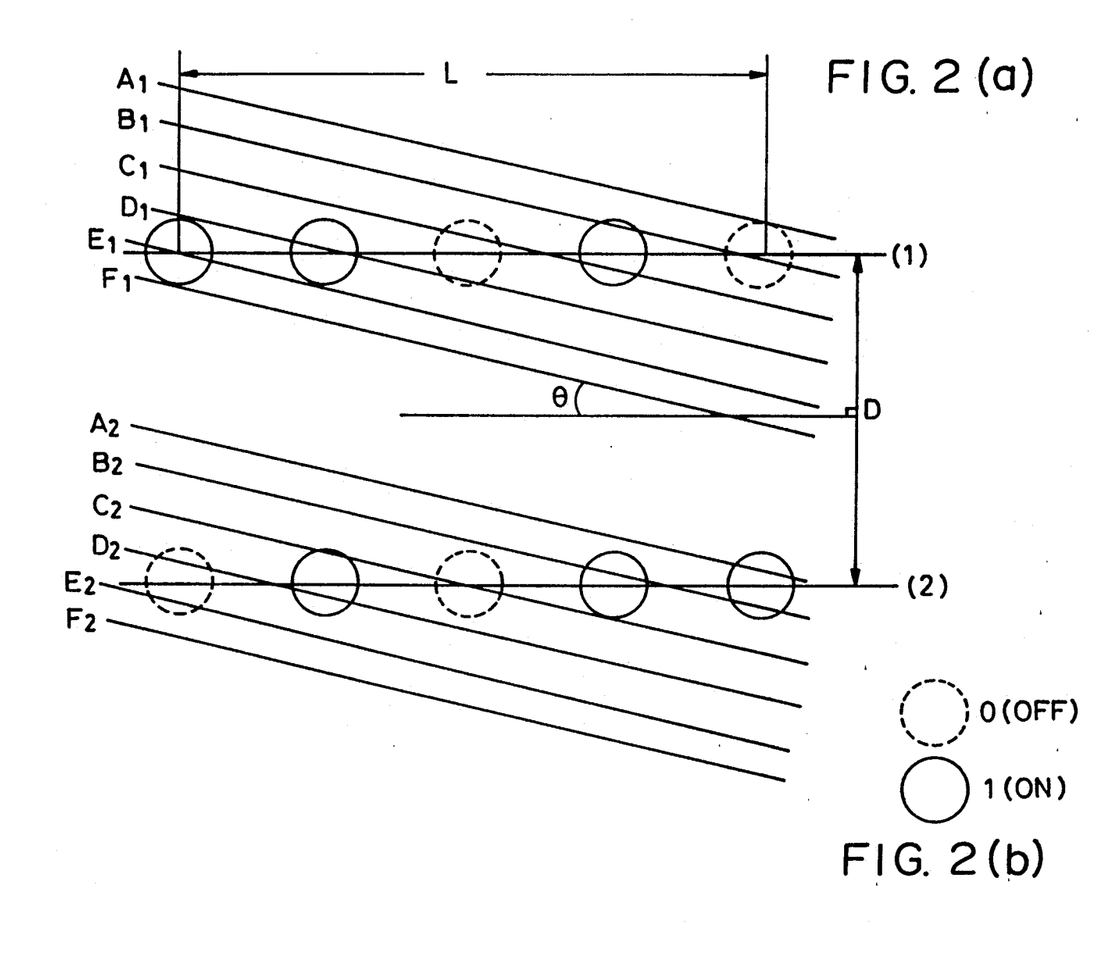
FIGS. 2(a) and 2(b) are diagrams illustrating the scanning method of a reading system for scanning recorded signals.
Figure 3:
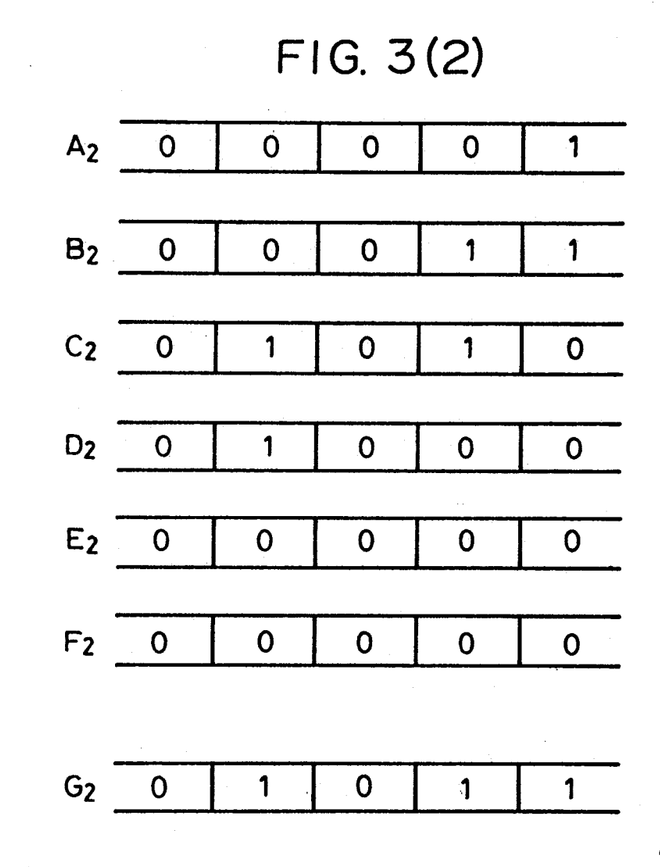

As an example of recording and reproducing information using the apparatus having the above-described configuration, an explanation will be provided of a case wherein recording and reproducing operations are performed using binary values, i.e., 0 (OFF) and 1 (ON). FIG. 2 is a schematic diagram showing reference-position patterns and recorded signal regions on the recording medium 2. In FIG. 2, line (1) represents a first recorded line, and line (2) represents a second recorded line. Five recording bits are formed on each of the recorded lines. As depicted in FIG. 2(b), a bit indicated by a broken circle represents a 0 (OFF) state, and a bit indicated by a solid circle represents a 1 (ON) state.

When recording information using an apparatus having the configuration shown in FIG. 1, care must be taken so as not to produce crosstalk between lines influenced by accuracy in the piezoelectric elements of the fine-movement mechanism 4 for driving the probe electrode 1. Accordingly, a recording operation is performed while scanning the probe electrode 1 along the lines (1) and (2) so that the interval D between the lines (1) and (2) satisfies the condition of $D > 2 \times L/\tan \theta$, where $\theta$ represents the maximum angular error estimated to occur during a reproducing operation, and L represents the length of one line.

In a recording operation, the space between the recording medium 2 and the probe electrode 1 is subjected to feedback control so that the current between the recording medium 2 and the probe electrode 1 is about 1 pA (picoampere). The recording medium 2 is scanned with the probe electrode 1 in a predetermined scanning direction using the fine-movement mechanism 4 while maintaining the above-described space between the recording medium 2 and the probe electrode 1. The probe electrode 1 is stopped at the position of predetermined X and Y coordinates where information "1" is to be recorded, and the position in the Z direction is fixed. When the distance between the recording medium 2 and the probe electrode 1 has been fixed, a recording operation is performed by applying a voltage (write pulse voltage) having the shape of a triangular-wave pulse shown in FIG. 4. When information to be recorded is 0, an erasing operation (0 recording) is performed by applying a voltage (erase pulse voltage) having the shape of a triangular-wave pulse shown in FIG. 5. Such operations are performed for respective recording positions, and the recording operation is terminated.

Next, an explanation will be provided of operations performed when the information on the recording medium 2 which was recorded in the above-described manner is to be reproduced. Data is recorded in respective recorded segments on the recording medium 2 as differences in conductivity. Hence, determination of OFF or ON is performed according to a difference in conductivity. More specifically, in FIG. 1, a constant bias voltage is applied between the probe electrode 1 and the recording medium 2 while scanning the recording medium 2 with the probe electrode 1 by means of the fine-movement mechanism 4, and data is read according to the value of a tunnel current flowing in accordance with the conductivity of each segment.

In the present invention, in order to reproduce only information recorded on each line using a scanning density higher than the recording density in a writing operation, scanning is performed so as to cover a region where information for one line has been recorded, with a scanning interval smaller than the size of the recorded bits, i.e., half the size in the present embodiment, as shown in FIG. 2. Six scanning operations, as indicated by An, Bn, Cn, Dn, En and Fn (n=1, 2, ...) shown in FIG. 2, are performed for reading the recorded information on each line. FIG. 2 shows a state wherein the direction of reproducing scanning is inclined by an angle $\theta$ relative to the recorded lines (1) and (2).

Respective bits on the respective lines An, Bn, Cn, Dn, En and Fn shown in FIGS. 3(1) and 3(2) represent the states of data read in the six respective scanning operations. Although the contents of the data may differ in accordance with the above-described angle $\theta$ of inclination, if a bit comprises 1 (ON), a recorded 1 (ON) must be contained in at least one of the columns representing respective bits in the vertical direction in the data corresponding to the bit on the lines An–Fn shown in FIG. 3(1) and 3(2). If all of the bits in the vertical direction are 0 (OFF), the corresponding bit comprises 0 (OFF). Accordingly, by calculating the logical sum of respective bits in the vertical direction at each bit position on the lines An–Fn, recorded information can be reproduced as represented by Gn shown in FIGS. 3(1) and 3(2). Such reproducing operation is performed by first storing respective read data in the field memory 9, and calculating the logical sum of respective bits at each bit position by the arithmetic circuit 10.

This operation will be further explained in detail with reference to FIG. 1.

A current (tunnel current) flowing in the probe electrode 1 when the probe electrode 1 scans the recording medium 2 by means of the fine-movement mechanism 4 is amplified by the current amplifier 3, is converted into binary signals (reproduced information) by a comparator (not shown), and is stored in the field memory 9 in units of a scanning line.

The arithmetic circuit 10 calculates for each bit position the logical sum of sets of information reproduced from respective scanning lines which are situated at each corresponding bit position and stored in the field memory 9. The logical-sum information is output to the control arithmetic circuit 7 as recorded information. The control arithmetic circuit 7 demodulates the recorded information according to the output value.

EXAMPLE 2

Figure 4:
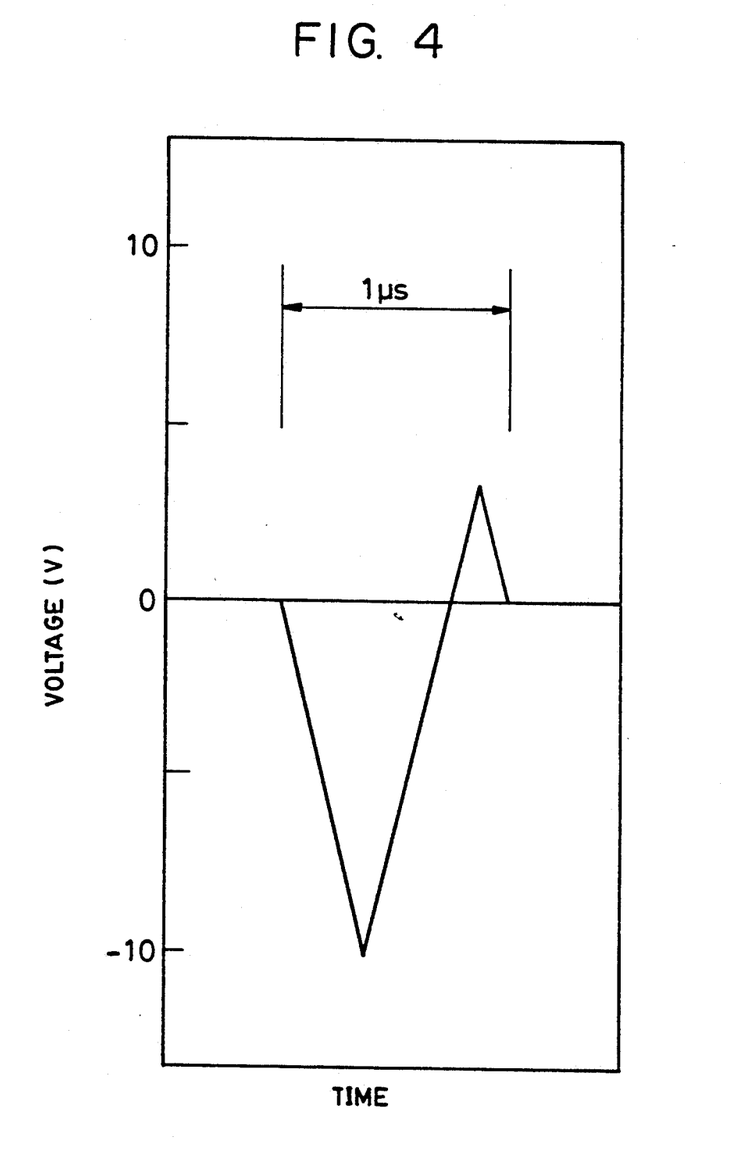
FIG. 4 is a diagram showing the waveform of a write pulse voltage.
Figure 5:
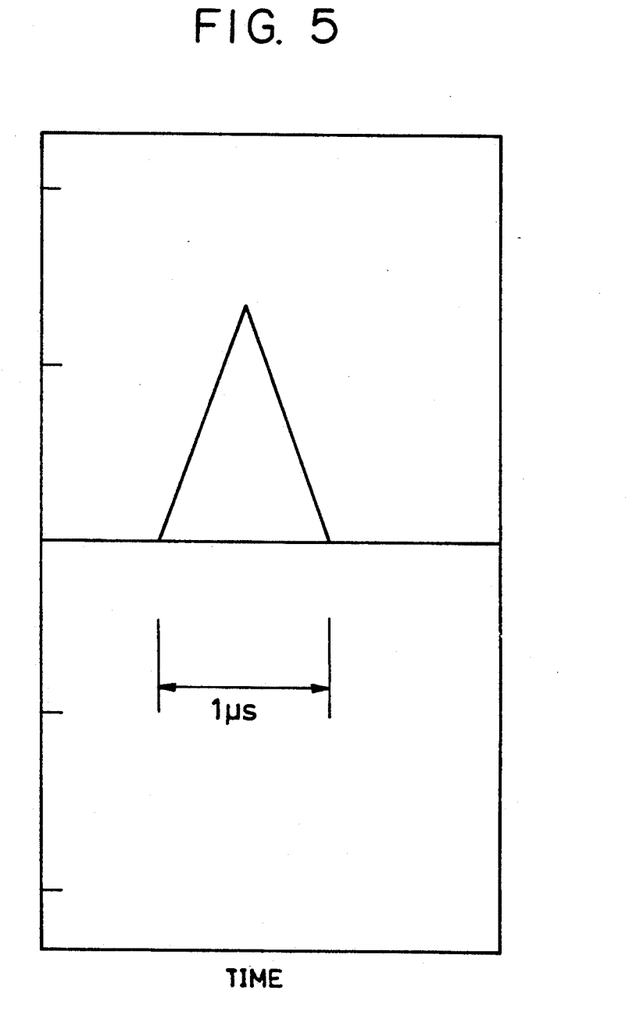
FIG. 5 is a diagram showing the waveform of an erase pulse voltage.
Figures 6A, 6B:
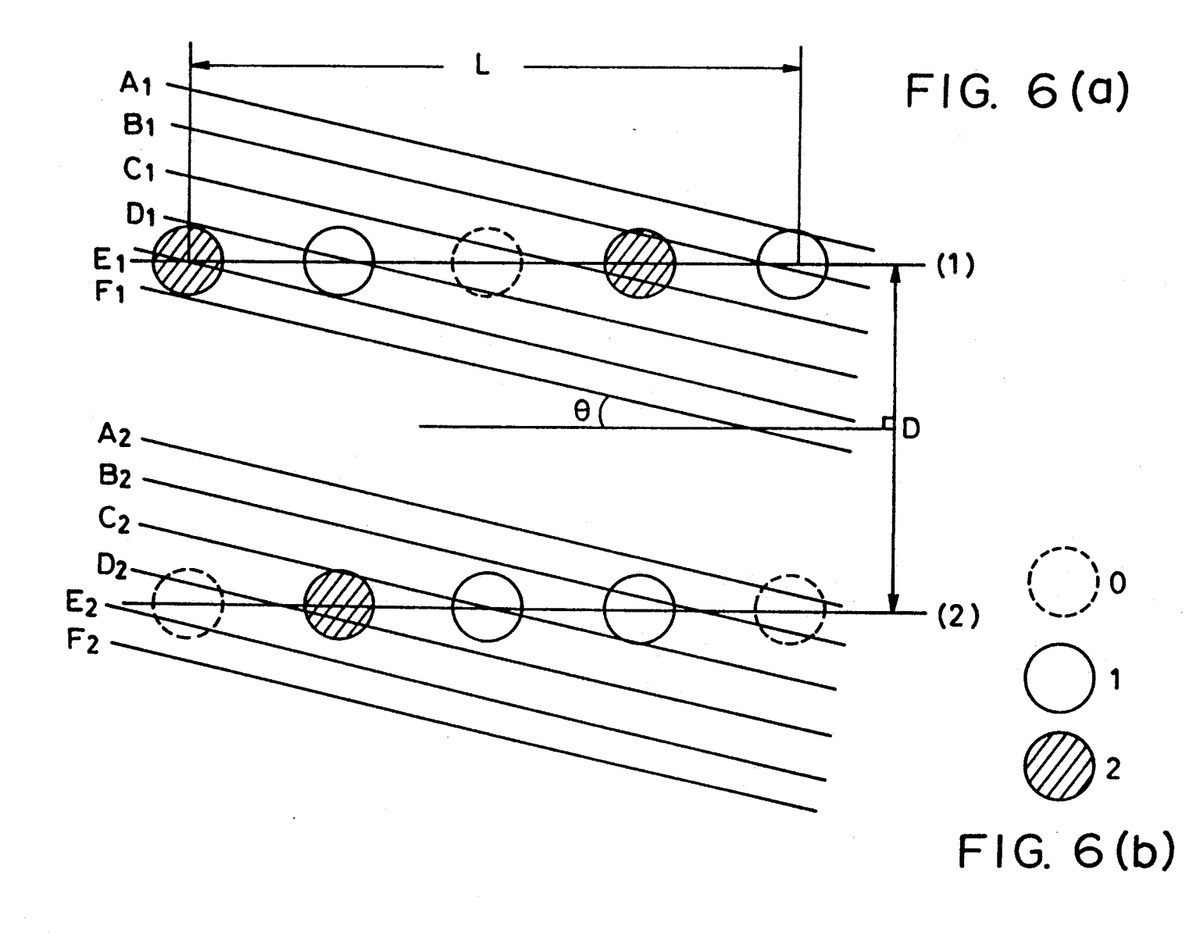
FIGS. 6(a) and 6(b) are diagrams illustrating the scanning method of a reading system for recorded signals in a second embodiment of the present invention.
Figure 7:
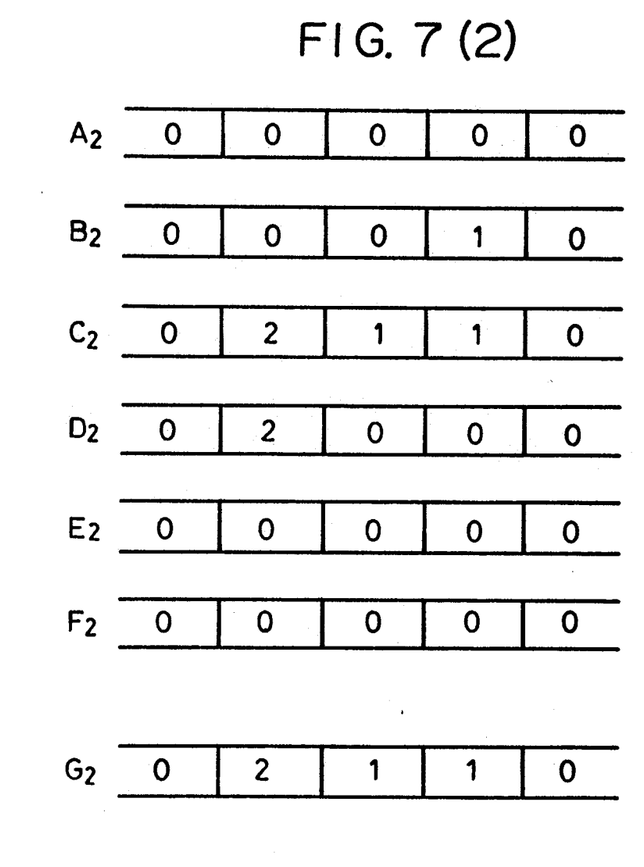

An explanation will now be provided with reference to FIGS. 6, 7(1) and 7(2) of a second example for recording and reproducing information using the apparatus having the above-described configuration, wherein the recording and reproducing operations use multivalue data having at least three values 0, 1 and 2. The configuration of the apparatus which performs recording and reproducing operations is the same as that shown in FIG. 1. FIG. 6(a) is a schematic diagram showing reference-position patterns and recorded signal regions on the recording medium 2. In FIG. 6(a), line (1) represents a first recorded line, and line (2) represents a second recorded line, and wherein five recorded bits are formed on each of the recorded lines. A bit indicated by a broken circle represents a state of 0, a bit indicated by a solid circle represents a state of 1, and a bit indicated by hatching represents a state of 2. In a recording operation, the position of the probe electrode 1 is controlled in the same manner as in the first example. Voltages having the values of 6 V and 3 V and the shape of a pulsed waveform shown in FIG. 5 are applied when information to be recorded comprises 0 and 1, respectively. A pulsed voltage having the waveform shown in FIG. 4 is applied when information to be recorded comprises 2. Thus, recording operations using three values are performed such that each of the states represent a different conductivity formed on the recording medium during a recording operation.

In a reproducing operation, since the amount of the tunnel current flowing in accordance with multivalue recorded information differs, demodulation is performed so as to provide three values, and data shown in FIGS. 7(1) and 7(2) are obtained. Accordingly, by calculating the logical sum of respective bits in the vertical direction of lines An–Fn in the same manner as in example 1, information represented by Gn shown in FIG. 7 can be reproduced. Recording and reproducing operations can also be performed by the same processing when multivalue data comprising at least four values are dealt with.

As described above, according to the present invention, tolerance of positional accuracy of a probe in a recording or reproducing operation can be increased, whereby information can be securely reproduced even if positioning (tracking) by feedback control is not performed.

What is claimed is:

1. An information reproducing method for reading information recorded on a recording medium by effecting relative scanning of the recording medium and a probe electrode, said method comprising the steps of:
    detecting reproduced information from a predetermined region on the recording medium by scanning the predetermined region a plurality of times at different positions such that a density of scanning lines is higher than a density of information recorded on the predetermined region; and
    determining the recorded information by calculating a logical sum of information reproduced during each scanning of the predetermined region.

2. An information reproducing method according to claim 1, wherein the reproduced information is detected by detecting a current flowing in the probe electrode when a voltage is applied between the recording medium and the probe electrode.

3. An information reproducing method according to claim 2, wherein the detected current is a tunnel current.

4. An information reproducing apparatus for reading information recorded in a predetermined region on a recording medium by effecting relative scanning of the recording medium and a probe electrode, said apparatus comprising:
    a probe electrode;
    a stage for holding the recording medium disposed so as to face said probe electrode with a predetermined space between the recording medium and said probe electrode;
    driving means for driving said probe electrode so as to scan a recorded region on the recording medium a plurality of times at different positions such that a density of scanning lines is higher than a density of the recorded information;
    voltage application means for applying a voltage between said probe electrode and the recording medium;
    means for storing values corresponding to current values flowing in said probe electrode during the scanning of the recorded region; and
    calculation means for determining the reproduced information read from the recording medium by calculating a logical sum of the values corresponding to the plurality of current values stored in said storing means.

* * * * *

UNITED STATES PATENT AND TRADEMARK OFFICE
CERTIFICATE OF CORRECTION

PATENT NO. : 5,282,191
DATED : January 25, 1994
INVENTOR(S) : AKIHIKO YAMANO ET AL.

It is certified that error appears in the above-identified patent and that said Letters Patent is hereby corrected as shown below:

On title page, item [56]

Foreign Patent Documents,
        "1107341" should read --1-107341--.

COLUMN 5

Line 45, "represent" should read --represents--.
    Line 54, "exam-" should read --Exam- --.

Signed and Sealed this

Eighth Day of November, 1994

Attest:

BRUCE LEHMAN

*Attesting Officer*      *Commissioner of Patents and Trademarks*